United States Patent
Chan et al.

(10) Patent No.: US 8,001,609 B1
(45) Date of Patent: Aug. 16, 2011

(54) METHOD AND APPARATUS FOR PREVENTING THE INADVERTENT OR UNAUTHORIZED RELEASE OF INFORMATION

(75) Inventors: Kevin Chan, Ryde (AU); Christopher R. Gentle, Gladesville (AU); Julian James Orbach, North Ryde (AU); Alastair Rankine, Annandale (AU)

(73) Assignee: Avaya Inc., Basking Ridge, NJ (US)

( * ) Notice: Subject to any disclaimer, the term of this patent is extended or adjusted under 35 U.S.C. 154(b) by 1104 days.

(21) Appl. No.: 10/944,096

(22) Filed: Sep. 17, 2004

(51) Int. Cl.
*H04N 7/16* (2011.01)

(52) U.S. Cl. .............. 726/27; 726/1; 709/206; 709/207; 709/238; 709/242; 707/609; 707/705

(58) Field of Classification Search .......... 726/3, 26–27, 726/30, 1; 380/255–276; 705/57–58; 713/187; 709/206–207, 238, 242; 707/609, 705
See application file for complete search history.

(56) References Cited

U.S. PATENT DOCUMENTS

| | | | | |
|---|---|---|---|---|
| 5,017,917 | A | | 5/1991 | Fisher et al. ................. 340/14.1 |
| 5,790,789 | A | * | 8/1998 | Suarez .......................... 709/202 |
| 6,161,130 | A | | 12/2000 | Horvitz et al. |
| 6,175,831 | B1 | * | 1/2001 | Weinreich et al. .............. 707/10 |
| 7,184,538 | B1 | * | 2/2007 | Doskow et al. ............ 379/221.1 |
| 7,340,769 | B2 | * | 3/2008 | Baugher ............................ 726/5 |
| 7,363,490 | B2 | * | 4/2008 | Paulsen et al. ................ 713/154 |
| 7,421,472 | B1 | * | 9/2008 | Ross, Jr. ......................... 709/206 |
| 2002/0016818 | A1 | | 2/2002 | Kirani et al. |
| 2002/0042884 | A1 | | 4/2002 | Wu et al. |
| 2002/0161589 | A1 | * | 10/2002 | Strandberg ........................ 705/1 |
| 2002/0174010 | A1 | | 11/2002 | Rice, III |
| 2003/0237005 | A1 | | 12/2003 | Bar-Or et al. |
| 2004/0003289 | A1 | | 1/2004 | Bhogal et al. |
| 2004/0024826 | A1 | | 2/2004 | Halahmi et al. |
| 2004/0093428 | A1 | * | 5/2004 | Arnold et al. ................. 709/242 |
| 2004/0117456 | A1 | | 6/2004 | Brooks |
| 2004/0177271 | A1 | * | 9/2004 | Arnold et al. ................. 713/201 |
| 2004/0199587 | A1 | | 10/2004 | Mcknight |
| 2006/0031328 | A1 | * | 2/2006 | Malik ............................ 709/206 |
| 2006/0048210 | A1 | * | 3/2006 | Hildre et al. ...................... 726/1 |
| 2006/0053280 | A1 | * | 3/2006 | Kittle et al. ................... 713/156 |
| 2006/0224750 | A1 | * | 10/2006 | Davies et al. ................. 709/229 |

OTHER PUBLICATIONS

Cooke, "An Expert on a Disk: Automating Data Classification Work Using Expert Systems," W.J. Cooke & Associates, 1994, pp. 1-7, available at http://www.uncle.com/es4dsc.html, printed May 3, 2004.
SpamBayes: Bayesian anti-spam classifier written in Python, pp. 1-5, available at http://spambayes.sourceforge.net/, printed May 3, 2004.

(Continued)

*Primary Examiner* — Thanhnga B Truong
(74) *Attorney, Agent, or Firm* — Sheridan Ross P.C.

(57) ABSTRACT

The present invention is directed to avoiding the unintentional release of sensitive or proprietary information. According to embodiments of the present invention, the content of a message is analyzed to determine whether delivery of that content to an address associated with the message is appropriate. This analysis may be performed in connection with Bayesian content analysis algorithms. The present invention may also analyze whether addresses associated with a message are appropriate for receiving that message by analyzing whether those addresses belong to the same or compatible groups. If a message is determined to be inappropriate for delivery to an associated address, delivery of that message is modified. Such modification may include delaying delivery until confirmation that delivery is to be completed is received from the user or some other authority.

15 Claims, 3 Drawing Sheets

OTHER PUBLICATIONS

U.S. Appl. No. 10/760,681, filed Jan. 19, 2004, Chan et al.
U.S. Appl. No. 12/242,905, filed Sep. 30, 2008, Chan et al.
Official Action for U.S. Appl. No. 12/242,905, mailed Nov. 29, 2010.
Background of the Invention for the above-captioned application, filed Sep. 17, 2004 (previously provided).
Official Action for U.S. Appl. No. 12/242,905, mailed Jun. 9, 2010.

* cited by examiner

US 8,001,609 B1

METHOD AND APPARATUS FOR PREVENTING THE INADVERTENT OR UNAUTHORIZED RELEASE OF INFORMATION

FIELD OF THE INVENTION

The present invention is related to preventing the inadvertent or unauthorized release of information. In particular, the present invention relates to monitoring the potential recipients of information and the content of that information.

BACKGROUND OF THE INVENTION

Electronic communication systems provide a convenient, cost-effective means for sharing and distributing information. However, the ease with which information can be made available can result in the inadvertent release of confidential and private information. The results of such inadvertent releases can be inconvenient, are often embarrassing for the sender, and can be costly, for example where valuable proprietary information of a company is released. With the increasing prevalence of malicious programs, releases of information through electronic communication systems can occur without direct user involvement.

In order to protect proprietary or private information, such information may bear a restrictive legend, such as "CONFIDENTIAL." Such markings are intended to warn a viewer that unrestricted release of the information is to be avoided. However, a user may disregard or fail to see such legends when attaching the information to an email, or otherwise making an electronic version of the information available to another user. Unintentional releases of information can also be made if a user incorrectly addresses an electronic message containing proprietary information. For example, a user may select one or more addresses in addition to or instead of an intended address. As another example, a user may choose to send an electronic message to a mailing list that includes an unauthorized address that the sender is not aware of. For instance, an internal mailing list may contain an external address.

Another source of potentially harmful releases of information are malicious programs, such as Trojan horses and viruses. If such a malicious program loads itself onto a machine, it may direct that information stored on or available to that machine be sent to some other machine. This typically occurs in the background, without any overt indication of the activity being provided to the user.

Although programs exist to detect the large scale misuse of electronic communications, such as may be observed in connection with spamming operations, the responsibility for determining that content provided through a particular device or in association with a particular user is properly addressed and/or released is with the user. In particular, although Internet Service Providers (ISPs) and companies may monitor network traffic for unauthorized messages, such monitoring is not done in the context of looking at individual messages. Furthermore, even if a system for monitoring releases of information is in place, where the sender of a message has authority to send proprietary information, no additional check may be made.

Other programs for protecting against malicious programs are generally concerned with preventing a user from loading such programs onto their machine in the first place. Programs for rejecting spam messages only consider incoming messages. Accordingly, such programs do not provide protection against unintended releases of information.

SUMMARY OF THE INVENTION

The present invention is directed to solving these and other problems and disadvantages of the prior art. According to embodiments of the present invention, the unintended release of information is avoided by determining whether content to be released is appropriate for the proposed addressee or proposed audience. If the content is determined to be inappropriate for the proposed addressee or proposed audience, delivery of that content is modified.

In accordance with embodiments of the present invention, the address associated with the message is categorized to determine whether the recipient is internal, external, or in some other relationship to an entity or other organization associated with the sending user. This information can be used as a scoring input to an algorithm for determining whether the proposed release of information is appropriate. In addition, past sender behavior can be used as a scoring input to the algorithm. The scoring algorithm may comprise a Bayesian algorithm or some other content analysis algorithm. If the content of the email looks appropriate for the proposed release, delivery of the message may proceed normally. However, if the content of the email, which may include the content of any associated document or other attachment, appears to be inappropriate, delivery of the message may be modified. The modification of delivery may comprise saving the message in a "to be sent" area of the email server and providing a copy of the email for further review. Upon further review, the user or some other authority may confirm that the message is to be sent, add a proprietary marking (such as "confidential") and then send the message, alter a delivery address associated with the message, or delete the message. Where a message contains multiple addresses, modification of delivery may include sending the message to all of the addresses that are deemed to be appropriate, and holding the message with respect to those addresses that appear questionable pending further review.

In accordance with other embodiments of the present invention, a user's email addresses may be sorted into categories. This can be done manually or automatically, for example by looking up details associated with addresses contained in contact databases, such as a corporate directory. The category of an addressee can then be compared to the content of an email message to determine whether it is appropriately addressed. In addition, address field combinations may also be monitored. For instance, a message that is addressed to both a first address included in a list of business addresses and a second list included in a list of personal addresses may be flagged as unusual.

In accordance with embodiments of the present invention, the algorithm monitoring outgoing emails comprises a Bayesian filter, training on the type of language normally used when communicating with individuals and/or distribution lists. During the initial training, email sent to one user is assumed to be strongly appropriate for that user, moderately appropriate for the user's group, and moderately inappropriate to users in other groups. If desired, the user may manually override this initial assumption. As the corpus of training emails grows, the Bayesian filter will be able to detect some significant features of an email as being inappropriate for the selected audience.

In accordance with further embodiments of the present invention, content may be monitored to determine whether a proposed access level assigned to such content by a user is appropriate. For instance, content may be analyzed to determine whether posting on a public website is appropriate, or whether access to such content should be limited in some way. This analysis may be performed by comparing details of the content to the access level proposed.

Additional features and advantages of the present invention will be come more readily apparent from the following description, particularly when taken together with the accompanying drawings.

DETAILED DESCRIPTION

Figure 1:
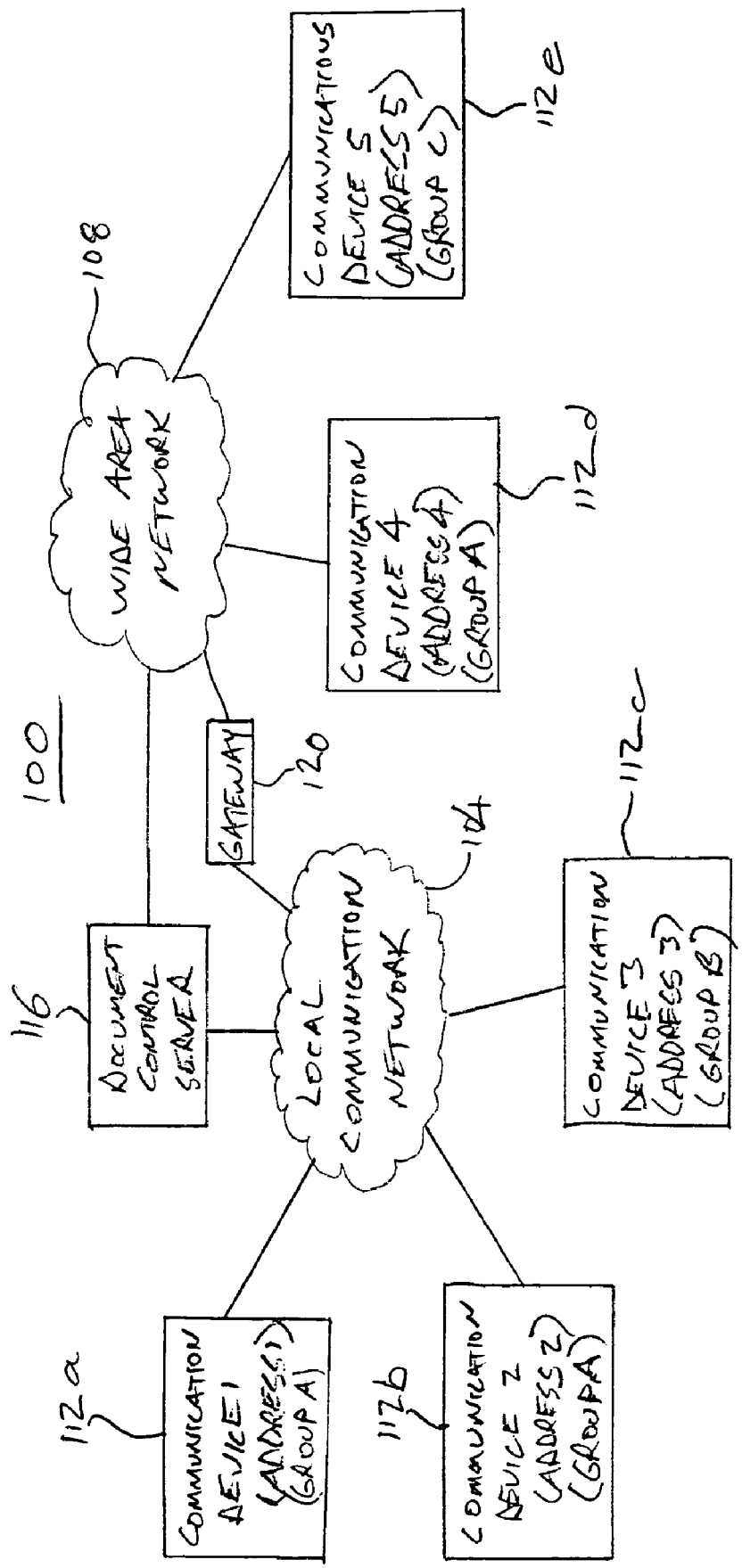
FIG. 1 is a block diagram depicting a system in accordance with embodiments of the present invention.

With reference now FIG. 1, a communication system 100 in accordance with embodiments of the present invention is depicted. The communication system 100 may include a local communication network or local area network (LAN) 104 that is interconnected to an unsecure communication network 108, for example a wide area network. This system also includes a number of communication devices 112, which may communicate with one another through one or more of the communication networks 104, 108. The system also includes a document control server 116. As depicted in FIG. 1, the document control server 116 may serve to interconnect the local communication network 104 to the wide area network 108. As can be appreciated by one of skilled in the art from the description provided herein, the physical connection between the two networks 104, 108 is not required to be through the document control server 116 itself. Accordingly, communications between the local communication network 104 and the wide area network 108 may be through another device, such as a gateway 120.

In accordance with embodiments of the present invention, the local communication network 104 may include one or more packet data networks under the control of a single entity. Accordingly, the local communication network 104 may comprise a private or corporate LAN. The wide area network 108 may also comprise a packet data network. In addition, the wide area network 108 may comprise a combination of private and public networks, and may further include the public Internet.

The various communication devices 112 may comprise devices capable of sending and/or receiving data transmitted over packet data type networks, such as networks 104 or 108. Accordingly, examples of communication devices 112 include general purpose computers, personal digital assistants, or other devices capable of making content available on a network.

The document control server 116 may comprise an email server or other device capable of monitoring activity on the local communication network 104. Furthermore, as will be described in greater detail elsewhere herein, the document control server 116 executes instructions for preventing the inadvertent or unauthorized release of information by client communication devices 112. Such instructions may comprise algorithms for performing key word searching, Bayesian analysis, or other techniques for analyzing the content and/or selections of addresses associated with messages. In addition, the document control server 116 may provide storage for messages, including messages that have not been delivered due to operation of the algorithms implemented by the document control server 116. The gateway 120 may comprise a conventional gateway for interconnecting communication networks. Alternatively, the functions that would be performed by a separate gateway 120 may be integrated into the document control server 116.

Figure 2:
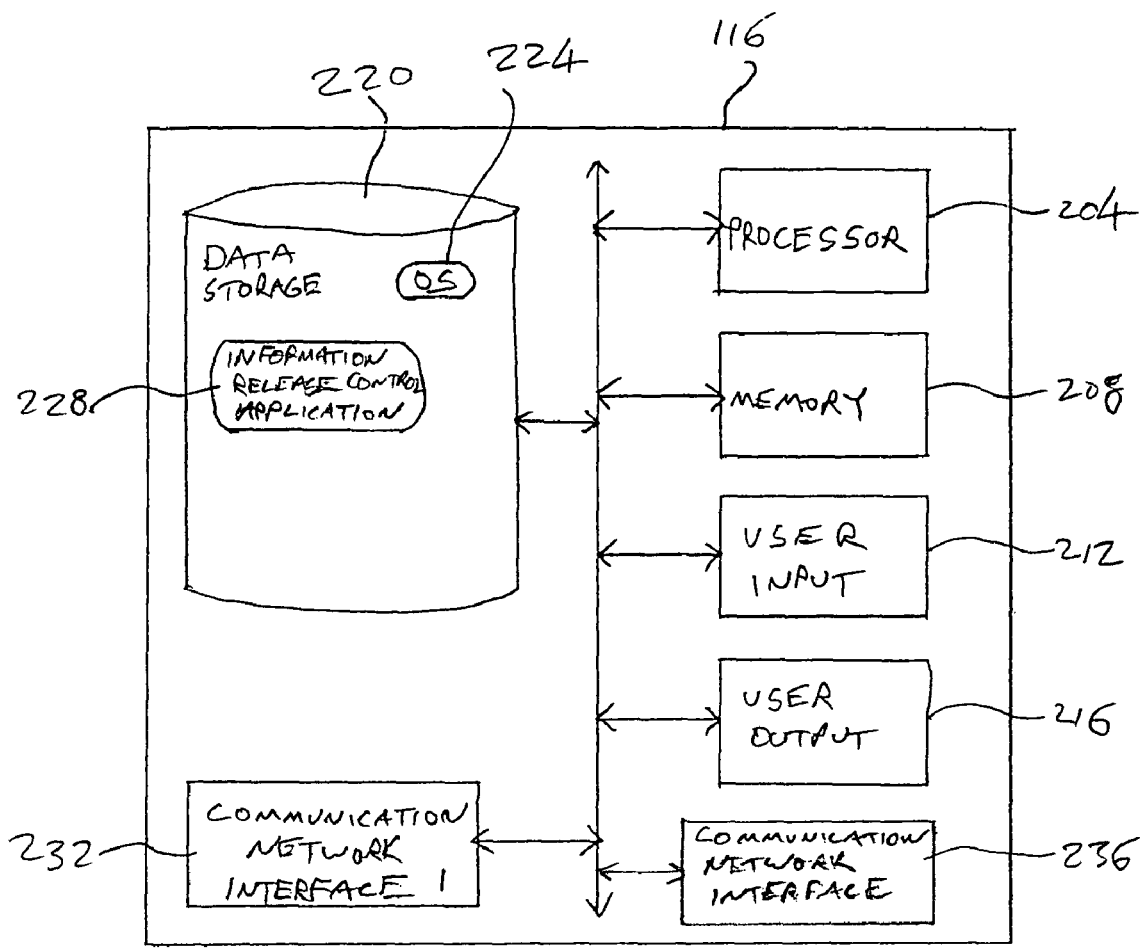
FIG. 2 is a block diagram depicting a document control server in accordance with embodiments of the present invention.

With reference now to FIG. 2, a document control server 116 in accordance with embodiments of the present invention is illustrated. In general, the document control server 116 may include a processor 204 capable of executing program instructions. Accordingly, the processor 204 may include any general purpose programmable processor or controller for executing application programming. Alternatively, the processor 204 may comprise a specially configured application specific integrated circuit (ASIC). The processor 204 generally functions to run programming code implementing various of the functions performed by the document control server 116, including an application for preventing the inadvertent or unauthorized release of information as described herein.

The document control server 116 may additionally include memory 208 for use in connection with the execution of programming by the processor 204, and for the temporary or long term storage of data, messages, or program instructions. The memory 208 may comprise solid state memory, such as DRAM and SDRAM. Where the processor 204 comprises a controller, the memory 208 may be integral to the processor 204. In addition, the document control server 116 may comprise one or more user input devices 212. For example, user input devices 212 may include a keyboard and a pointing device, for example for receiving instructions and information from an administrator. The document control server 116 may also include one or more user output devices 216. For example, a user output device 216 may include a video display.

The document control server 116 may also include data storage 220 for the storage of application programming and data. In addition, data storage 220 may be used to store messages that have had their delivery modified as described herein. In accordance with embodiments of the present invention, operating system software 224 may be stored in data storage 220. In addition, the data storage 220 may store an information release control application 228 as described herein. In accordance with embodiments of the present invention, the information release control application 228 may operate to analyze the content and associated addresses of a message prior to releasing that message for delivery as requested by a user. For example, the information release control application 228 may implement keyword searching for terms or addresses that suggest a need for further review or alternate handling of messages before they are sent. The information release control applications may also implement a Bayesian filter. The filter can train on the type of language contained in messages, the associated delivery addresses and/or the groupings of addresses. Other examples of analyses that may be applied include hidden Markov models and state space models.

The document control server 116 may also include a first communication network interface 232 for interconnecting the server 116 to the local communication network 104. Where the document control server 116 also functions as a gateway, a second communication network interface 236 may be provided for interconnecting the server 116 to the wide area network 108.

Figure 3:
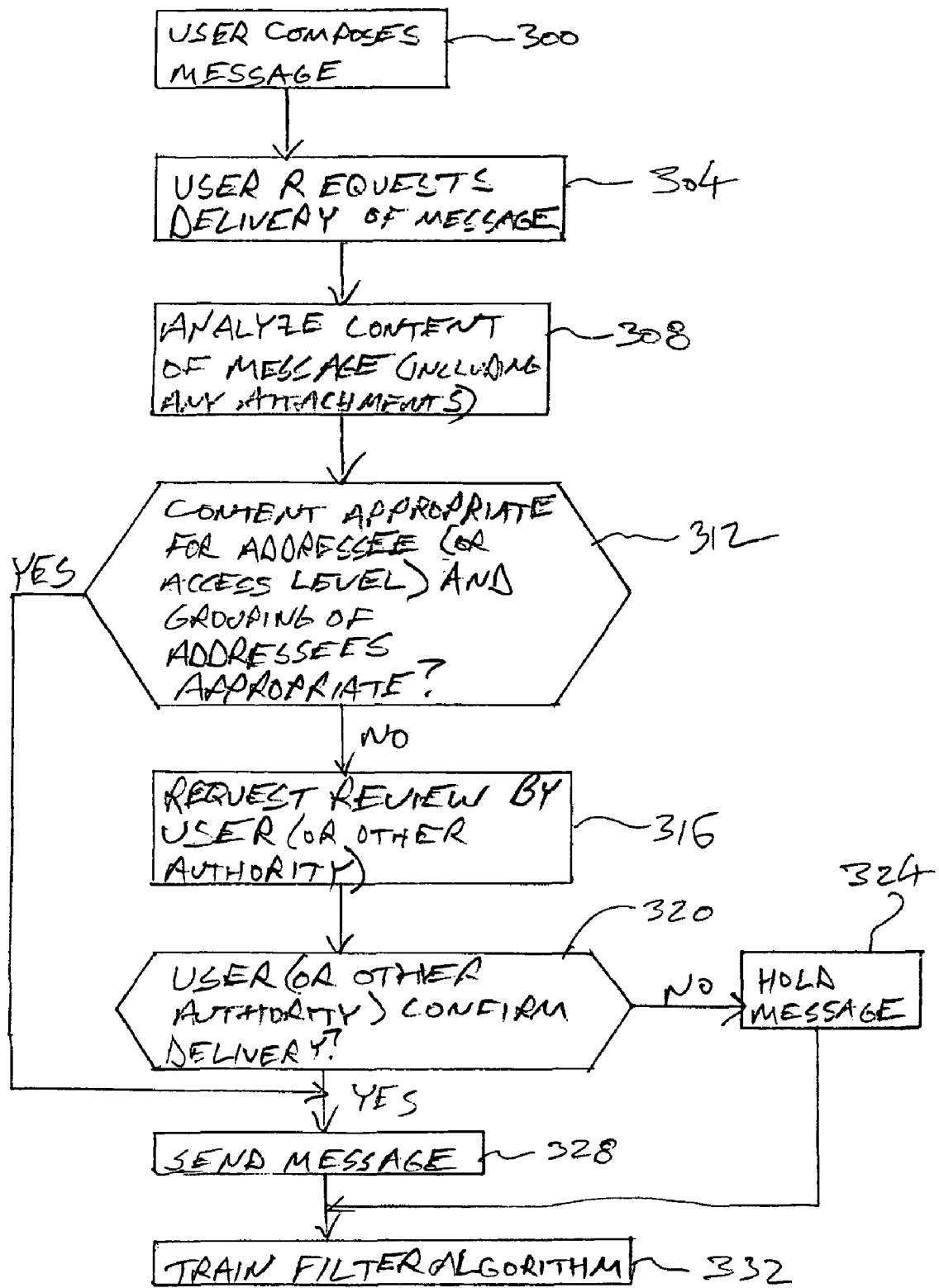
FIG. 3 is a flowchart illustrating aspects of the operation of a system in accordance with embodiments of the present invention.

With reference now to FIG. 3, aspects of the operation of a system 100 in accordance with embodiments of the present invention are illustrated. Initially, at step 300, the user of a first communication device 112a (see FIG. 1) composes a message. An example of a message is an email message containing textual content. A message may also include an email message with an attached file, in which case the content of that message includes the email message itself and the attached content. As used herein, a message may also include content, for example in the form of a computer data file, that is posted or otherwise made available to users of other communication devices 112. Accordingly, a message may include a textual document, presentation, graphic or other information that is made available to other communication devices 112.

At step 304, the user of the first communication device 112a requests delivery of the message 304. As can be appreciated by one of skill in the art, an email message is generally associated with one or more addresses to which the message is to be sent. Furthermore, in accordance with certain embodiments of the present invention, the message may be associated with an access level or a website or other address that can be accessed by the user of a communication device 112 to obtain access to that message.

The content of the message, including any attachments, is analyzed at step 308. Analysis of the message may include key word searching to determine the nature of the information included in the message. A determination is then made as to whether the content is appropriate for the addressee of an email message, and whether the grouping of addresses is appropriate where a message is to be delivered to multiple addresses (step 312). Alternatively, where the message comprises content that is to be posted, the access level that the user requesting posting has associated with the content, or that has been associated with the content by default, is analyzed. Determining whether content should be sent or posted may be made in connection with a Bayesian or other type of analysis. The Bayesian filter applied in connection with the analysis may be trained on the habits or history of a user to develop rules that are refined for that user. Other analysis methods that may be applied include hidden Markov models and state space models.

The analysis may comprise determining whether significant features or content of an email or message is inappropriate for the selected audience. For instance, analysis of the content may be performed by searching key terms. For example, if a manager sends an email to a technical discussion list, the term "budget" and "earnings per share" might be flagged as unusual. As another example, if a staff member sends an email to a key client with the name of their pet in it, that message could be flagged as unusual. Accordingly, it can be appreciated that addresses associated with or accessible by a communication device 112 may be grouped or otherwise characterized in order to assist in determining whether the content of a message is appropriate for delivery to a particular address.

An example of the grouping of addresses is shown in FIG. 1. For instance, a first communication device 112a may be associated with address 1 and Group A. As can be appreciated by one of skill in the art, different communication devices may be capable of sending and receiving messages associated with a particular address. In accordance with embodiments of the present invention, messages from the first communication device 112a associated with address 1 might always be considered appropriate if sent to another communication device 112 associated with an address included in Group A. Accordingly, messages from the first communication device 112a might always be considered appropriate if they are addressed to a second communication device 112b associated with address 2 and a fourth communication device 112d associated with address 4, as both the second 112b and fourth 112d communication devices are associated with Group A.

Whether a message initiated at the first communication device 112a is appropriately addressed to other communication devices 112 may also be determined with reference to the message content. For example, if the addresses associated with Group A correspond to the addresses of employees within particular department of an enterprise, only particular types of information may be considered appropriate if addressed to such addresses. For instance, if Group A comprises an engineering group within an enterprise, messages containing terms related to financial information may be flagged as inappropriate if addressed to addresses included in Group A. As another example, if a message containing financial information is directed to a third communication device 112c associated with a third address belonging to Group B, and Group B consists of addresses of enterprise employees associated with a financial group, messages containing financial information addressed to that communication device 112c may be considered appropriate, while messages containing technical information may be considered inappropriate. As still another example, a message containing information related to the operation of an enterprise addressed to a fifth communication device 112e associated with a fifth address that is included in a third group, and that third group contains the addresses of personal contacts of the user of the first communication device 112a, the message may be flagged as inappropriate.

In accordance with further embodiments of the present invention, whether a message is appropriate for a particular recipient may be determined, at least in part, based on the network that a particular address is associated with. For instance, a message sent from the first communication device 112a to an address associated with another communication device (e.g., 112b or 112c) on the local communication network 104 may always be considered appropriate, whereas that same message may not be considered appropriate for delivery to a communication device associated with an address on the wide area network 108 (e.g., communication device 4 112d or communication device 5 112e).

If the content of a message is not considered appropriate for delivery to the addressee, and/or the grouping of addressees associated with a message is considered inappropriate, the delivery of that message is modified. Modification of the delivery of a message may include requesting review by the user or some other authority of the message content and/or addressees (step 316). That is, the present invention may operate to request that the addresses associated with a particular message be double checked before delivery of that message is completed. Furthermore, in accordance with embodiments that request such confirmation from an authority that is separate from the user initiating the message, policies regarding the release of information, such as may be established by a corporate entity, may be enforced.

At step 320, a determination is made as to whether the user or other authority has confirmed delivery of the message. If delivery has not been confirmed, the message is held (step 324). In particular, the message may be returned to the communication device 112 that initiated the request for delivery or posting of the message. Alternatively, holding the message may comprise storing the message in memory 208 or data storage 220 associated with the document control server 116.

In connection with providing confirmation that a message is to be delivered, the user or other authority may edit the message delivery parameters. For instance, an address associated with a message may be deleted or an attachment associated with that message may be removed.

After receiving confirmation that delivery is to proceed, or after determining that the content of a message is appropriate for the associated addressees, the message is sent (step 328). After sending the message, or after holding the message at step 324, the filter algorithm is trained (step 322). In particular, weights supplied by the filter algorithm with respect to the content of the message and associated addressees are altered to reflect the choices made by the sender, for example in initially selecting the content for delivery to the associated addresses and/or in confirming delivery of the message, with or without modifications to the message content or the addressees.

As can be appreciated from the description provided herein, embodiments of the present invention provide a system that can prevent or avoid the unintentional release or delivery of inappropriate content to an address. Accordingly, inadvertent releases of sensitive or privileged material can be avoided. Furthermore, although embodiments described herein have included the association of a document control server with a local communication network, the present invention is not so limited. For example, a system in accordance with embodiments of the present invention may comprise an information release control application running on a communication device associated with a single user, to assist that user in preventing or avoiding unintentional releases of inappropriate content through electronic messages.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A computational component for performing a method, the method comprising:
   detecting on a first network a first electronic message, wherein said first electronic message is addressed to first and second delivery addresses;
   interrupting a delivery of said first electronic message;
   analyzing said first and second delivery addresses of said first electronic message;
   in response to determining that said delivery addresses are of a first type, analyzing a content of said first electronic message;
   in response to determining that said content of said first electronic message is not appropriate for delivery to said first delivery address, interrupting delivery of said first electronic message to said first delivery address, wherein said interrupting delivery of said first electronic message includes:
      modifying said first electronic message, wherein said modifying said first electronic message comprises adding a proprietary marking to said electronic message; and
      sending said modified first electronic message to said first delivery address;
   in response to determining that said content of said first electronic message is appropriate for delivery to said second delivery address, allowing delivery of said first electronic message to said second delivery address;
   detecting on said first network a second electronic message, wherein said second electronic message is addressed to said first and second delivery addresses;
   interrupting a delivery of said second electronic message;
   analyzing said first and second delivery addresses of said second electronic message;
   in response to determining that said first and second delivery addresses are of a first type, analyzing a content of said second electronic message;
   in response to determining that said content of said second electronic message is appropriate for delivery to said first delivery address, allowing delivery of said second electronic message to said first delivery address;
   in response to determining that said content of said second electronic message is not appropriate for delivery to said second delivery address, interrupting delivery of said second electronic message to said second delivery address.

2. The method of claim 1, wherein said modifying said first electronic message comprises removing content that is not appropriate for delivery to said first delivery address.

3. The method of claim 1, wherein said modifying said first electronic message includes returning said first electronic message to a sender.

4. The method of claim 1, wherein said first electronic message includes an attachment, and wherein said analysis of said first electronic message includes an analysis of said attachment.

5. The method of claim 1, wherein said first electronic message is associated with a plurality of delivery addresses, and wherein at least one of said delivery addresses is determined to be of said first type.

6. The method of claim 1, wherein delivery of said first electronic message to a delivery address that is appropriate for said content is not interrupted.

7. The method of claim 1, wherein said analyzing a content of said first electronic message comprises at least one of key word searching, a Bayesian analysis, a hidden Markov analysis or a state space analysis of said content.

8. The method of claim 1, wherein first content is determined to be inappropriate for a first delivery address in a first instance, and wherein said first content is determined to be appropriate for said first delivery address in a second instance, wherein delivery of said first content to said first delivery address was not approved by a user in said first instance, and wherein delivery of said first content to said first delivery address was approved by said user in said second instance.

9. The method of claim 1, wherein said computational component comprises a computer readable storage medium containing instructions for performing the method.

10. The method of claim 1, wherein said computational component comprises a logic circuit.

11. A communication system, comprising:
   means for providing electronic content associated with a first address;
   means for detecting a request from said means for providing electronic content to make first and second content available to at least a first and second means for receiving electronic content as part of first and second electronic messages respectively;
   means for determining a content of said first and second electronic messages;

means for modifying delivery of said first and second electronic messages, wherein said modifying said delivery of said first and second electronic messages comprises adding a proprietary marking to said first and second electronic messages, wherein delivery of said first electronic message is modified in response to determining that said first content of said first electronic message should not be delivered to said at least first means for receiving electronic content, wherein said first electronic message is delivered to said second means for receiving electronic content, wherein said first electronic message is not delivered to said first means for receiving electronic content, wherein said means for modifying delivery of said first and second electronic messages forms a modified first electronic message and releases said modified first electronic message for delivery to said first means for receiving content, wherein delivery of said second electronic message is modified in response to determining that said second content of said second electronic message should not be delivered to said at least second means for receiving electronic content, wherein said second electronic message is delivered to said first means for receiving electronic content, and wherein said first second electronic message is not delivered to said second means for receiving electronic content.

12. The system of claim 11, wherein said modified first electronic message comprises at least an encrypted version of said first electronic message.

13. The system of claim 11, wherein said means for modifying delivery of said first and second electronic messages delivers said first electronic message to an authority for additional analysis.

14. The system of claim 11, wherein said means for modifying delivery of said first and second electronic messages returns said first electronic message to said means for providing electronic content associated with a first address.

15. The system of claim 12, wherein said first means for receiving electronic content is associated with a communication network that is local to said means for providing electronic content associated with a first address, and wherein said second means for means for receiving electronic content is not associated with said local communication network.

* * * * *